United States Patent [19]

Ohgami et al.

[11] Patent Number: 4,564,531

[45] Date of Patent: Jan. 14, 1986

[54] PROCESS FOR PRODUCTION OF PROCESSED SWEET CORN

[75] Inventors: Tadashi Ohgami; Zenjiro Naitoh, both of Yokohama; Haruo Saotome; Kenji Takekoshi, both of Kawasaki; Kimio Saitoh, Atsugi, all of Japan

[73] Assignee: Knorr Shokuhin Kabushiki Kaisha, Kawasaki, Japan

[21] Appl. No.: 755,537

[22] Filed: Jul. 15, 1985

Related U.S. Application Data

[63] Continuation of Ser. No. 571,522, Jan. 17, 1984, abandoned.

[51] Int. Cl.$^4$ .................... A23L 1/212; A23L 1/40
[52] U.S. Cl. ................................ 426/589; 426/618; 426/628; 426/656; 426/639
[58] Field of Search ............... 426/589, 618, 628, 639, 426/626, 656

[56] References Cited

U.S. PATENT DOCUMENTS

| | | | |
|---|---|---|---|
| 2,135,445 | 11/1938 | Walsh | 426/618 |
| 2,989,404 | 6/1961 | Nelson | 426/628 |
| 3,005,718 | 10/1961 | Cover et al. | 426/628 |
| 3,007,798 | 11/1961 | Ohtaki | 426/618 |

*Primary Examiner*—Jeanette Hunter
*Attorney, Agent, or Firm*—Rodman & Rodman

[57] ABSTRACT

Enhancing the flavor of sweet corn particularly for use in making corn powder for soups by converting sweet corn kernels into paste, adding a reducing sugar and a specific amino acid and heating the mixture.

11 Claims, No Drawings

PROCESS FOR PRODUCTION OF PROCESSED SWEET CORN

This is a continuation of application Ser. No. 571,522, filed Jan. 17, 1984, and now abandoned.

BACKGROUND OF THE INVENTION

This invention relates to a process for producing a sweet corn paste which has an overall improved flavor, sweetness, taste and color.

Sweet corn is popular because of its unique flavor, sweetness, taste and color. It is widely used for producing confectionary goods and processed foods and is also eaten fresh. In its use as a raw material for confectionary goods and processed foods, it is ofen used in the form of a paste.

However, sweet corn has quality fluctuations. Quite expectedly, good quality sweet corn has good flavor, sweetness, taste and color, and vice-versa. It is impossible to prepare a sweet corn paste from only good quality sweet corn. Thus, the sweet corn paste is usually made from a mixture of sweet corn of varying quality as the raw materials. This generally results in a poor quality sweet corn paste.

The addition of sucrose to sweet corn, or its paste, to enhance its sweetness has been a conventional approach. However, the addition of only sucrose, while enhancing sweetness also deteriorates the overall taste balance, thus adding a somewhat foreign flavor to the indigenous sweet corn taste.

SUMMARY OF THE INVENTION

In accordance with the present invention, it has been found that the overall flavor, sweetness, taste and color of sweet corn is improved by adding a reducing sugar or a reducing sugar and an amino acid mixture containing at least one amino acid selected from the group consisting of glutamic acid, aspartic acid, glycine, proline and alanine, to corn kernels before being prepared into a paste, then preparing the mixture into a paste and heating the paste. The invention also contemplates direct enrichment of a sweet corn paste with the aforesaid additives.

DESCRIPTION OF THE PREFERRED EMBODIMENTS

The present invention relates to the production of a processed sweet corn comprising adding at least one reducing sugar such as dextrose, fructose, and the like, or at least one reducing sugar, and at least one amino acid selected from the group consisting of glutamic acid, aspartic acid, glycine, proline and alanine, to a sweet corn paste or corn kernels before being prepared into a paste and, if necessary, processing the obtained sweet corn paste into a dried, canned or frozen product.

The raw material used in this invention can be a sweet corn paste, or unprocessed corn kernels.

The sweet corn paste can be easily obtained by crushing corn kernels either fresh or blanched. If corn kernels are used, they are crushed into a paste with a crusher after adding the additives. The additives added to the sweet corn paste or corn kernels are reducing sugars such as dextrose, fructose, etc., or such reducing sugars and at least one amino acid selected from the group consisting of glutamic acid, aspartic acid, glycine, proline and alanine.

As practiced in this invention, if a reducing sugar such as dextrose, fructose or maltose is added to the sweet corn paste, or used in combination with amino acids, the flavor, sweetness, taste and color are further improved. Dextrose and fructose are naturally contained in sweet corn, but their content in poor quality corn is low, thus reducing the overall flavor, sweetness, taste and color.

Both dextrose and fructose have a reducing group which reacts with amino acids and in turn improves the color, taste and flavor, and consequently the overall quality.

The dextrose and/or fructose can be in the form of a dextrose-fructose syrup which contains equal amounts of dextrose and fructose.

The dextrose-fructose syrup can have a water content of 25%, and is generally added in amounts of about 1-15%, preferably 1-10% to a sweet corn paste which has been adjusted to contain 70-80% water.

The amino acid to be added should be at least one amino acid selected from glutamic acid, aspartic acid, glycine, proline and alanine. These amino acids can be used alone or as a mixture. An amino acid mixture made by hydrolyzing vegetable or animal protein can also be used.

The addition of 0.1-0.6% powdered amino acid to a sweet corn paste which was adjusted to have a 70-80% water content is sufficient. If the addition level exceeds 0.8%, the product tends to have an amino acid taste, which is undesirable.

The sweet corn paste obtained by adding at least one of dextrose and fructose and at least one amino acid selected from the group consisting of glutamic acid, aspartic acid, glycine, proline and alanine can produce an excellent flavor, favorably intensified color, appropriate sweetness and an overall, well-balanced taste by heating it at 80°-100° C. during drying and sterilization. This causes a reaction between the sugar and amino acid. A heating temperature below 80° C. generates a heat-moldered odor, while temperatures above 100° C. generate a burnt odor. Both are undesirable. The following examples are representative of the invention. Therein and throughout the specification, all parts and percentages are by weight unless otherwise noted.

EXAMPLE 1

After blanching, fresh sweet corn kernels were crushed in a crusher to produce a sweet corn paste having a water content of 75%. To portions of this sweet corn paste, a dextrose-fructose syrup (25% water) was added at ratios of 0, 3, 6 and 9%, and a hydrolyzed soybean mixture which had been adjusted to contain 28% glutamic acid, 9% aspartic acid, 11% glycine, 15% proline and 12% alanine was added at ratios of 0, 0.2, 0.4 and 0.6%. The 16 samples thus obtained were kept at 100° C. for 10 minutes while stirring. A sensory evaluation of these samples was made in terms of flavor, sweetness, taste and color. The following tables show the results of the test.

TABLE 1-1

Flavor evaluation

| Syrup addition | Amino acid addition | | | |
|---|---|---|---|---|
| | 0% | 0.2% | 0.4% | 0.6% |
| 0% | 1 — 3.0 | 2 — 3.2 | 3 — 3.5 | 4 — 3.5 |
| 3% | 5 — 3.2 | 6 — 3.4 | 7 — 3.7 | 8 — 3.7 |
| 6% | 9 — 3.7 | 10 — 4.2 | 11 — 4.5 | 12 — 4.0 |
| 9% | 13 — 4.0 | 14 — 4.7 | 15 — 5.0 | 16 — 4.8 |

TABLE 1-2

Sweetness evaluation

| Syrup addition | Amino acid addition | | | |
|---|---|---|---|---|
| | 0% | 0.2% | 0.4% | 0.6% |
| 0% | 1 — 3.0 | 2 — 3.2 | 3 — 3.2 | 4 — 3.4 |
| 3% | 5 — 3.5 | 6 — 3.5 | 7 — 3.7 | 8 — 3.7 |
| 6% | 9 — 4.0 | 10 — 4.0 | 11 — 4.2 | 12 — 4.2 |
| 9% | 13 — 5.0 | 14 — 5.0 | 15 — 4.8 | 16 — 4.5 |

TABLE 1-3

Overall taste evaluation

| Syrup addition | Amino acid addition | | | |
|---|---|---|---|---|
| | 0% | 0.2% | 0.4% | 0.6% |
| 0% | 1 — 3.0 | 2 — 3.2 | 3 — 3.5 | 4 — 4.0 |
| 3% | 5 — 3.2 | 6 — 3.4 | 7 — 3.8 | 8 — 4.2 |
| 6% | 9 — 3.5 | 10 — 3.8 | 11 — 4.0 | 12 — 4.5 |
| 9% | 13 — 4.0 | 14 — 5.0 | 15 — 4.8 | 16 — 4.8 |

TABLE 1-4

Color evaluation

| Syrup addition | Amino acid addition | | | |
|---|---|---|---|---|
| | 0% | 0.2% | 0.4% | 0.6% |
| 0% | 1 — 3.0 | 2 — 3.2 | 3 — 3.5 | 4 — 4.0 |
| 3% | 5 — 3.2 | 6 — 3.5 | 7 — 3.8 | 8 — 4.2 |
| 6% | 9 — 3.5 | 10 — 4.0 | 11 — 4.5 | 12 — 4.8 |
| 9% | 13 — 4.0 | 14 — 4.2 | 15 — 4.8 | 16 — 5.0 |

Notes
Figures indicate average score of 20 panelists using 5-point scoring.
The numbers in the upper left hand corner of each box designate the composition of each sample.
The criteria for the evaluation scores are as follows:
(flavor, sweetness, taste as a whole, and color)
1: Worse than control
2: Slightly worse than control
3: Same as control
4: Slightly better than control
5: Better than control As shown in the Tables, when a dextrose-fructose syrup and an amino acid mixture were added to a sweet corn paste alone or in combination, all the samples obtained showed better results than the control.

Regarding the flavor (Table 1-1), compositions 10, 11, 12, 13, 14, 15 and 16 were highly rated. Regarding sweetness (Table 1-2), compositions 9, 10, 11, 12, 13, 14, 15 and 16 were preferred. Regarding the evaluation of overall taste (Table 1-3), compositions 8, 11, 12, 13, 14, 15 and 16 were highly rated. Regarding the color (Table 1-4), compositions 8, 10, 11, 12, 13, 14, 15 and 16 received high scores.

As stated above, since the resultant characteristics regarding flavor, sweetness, taste and color vary depending on the addition level, the conditions can be selected depending on the purpose for which the corn paste is used.

EXAMPLE 2

To 1 kg of a sweet corn paste containing 70% water, 50 g of fructose, and 2 g of glycine were added. The paste was heated at 100° C. for 30 minutes and then cooled. The sample (A) and a sample without addition of fructose and glycine (B) were organoleptically evaluated.

| | Flavor | Sweetness | Overall Taste | Color |
|---|---|---|---|---|
| (A) | 4.0 | 3.8 | 3.8 | 4.2 |
| (B) | 3.0 | 3.0 | 3.0 | 3.0 |

(A) was superior to (B) in all respects (flavor, sweetness, overall taste and color)

EXAMPLE 3

To 100 kg of fresh corn kernels, 5 kg of dextrose and 0.3 kg of MSG were added and the mixture was crushed with a crusher to prepare a paste. After heating the paste at 80° C. for 10 minutes, it was dried with a drum dryer (surface temperature 95° C.–125° C.) and then crushed. As a result, 25 kg of a sweet corn powder was obtained. This sweet corn powder (A), and a sweet corn powder (B) obtained by the same process without addition of dextrose and MSG, were organoleptically evaluated. For the test, 250 g of water was added to each of 15 g samples of (A) and (B), and the samples were then boiled. The samples were evaluated by 30 panelists in accordance with the criteria specified in Example 1.

|     | Flavor | Sweetness | Overall Taste | Color |
|-----|--------|-----------|---------------|-------|
| (A) | 4.5    | 3.7       | 4.5           | 4.0   |
| (B) | 2.8    | 3.0       | 2.9           | 3.0   |

(A) was superior to (B) in all respects (flavor, sweetness, taste as a whole and color).

EXAMPLE 4

Fresh sweet corn kernels were crushed with a crusher. A sweet corn paste (SCP) containing 75% water was obtained and named sweet corn paste (1). To this sweet corn paste (1), 9% of a dextrose-fructose syrup (water content 25%), and as the amino acid, 0.2% of a hydrolyzed soybean product which had been adjusted to contain 28% MSG, 9% aspartic acid, 11% glycine, 15% proline and 12% alanine, were added and mixed.

This mixture was named sweet corn paste (2). Sweet corn pastes (1) and (2) were separately heated at 100° C. for 10 minutes while stirring. Corn cream soup samples were prepared by using both (1) and (2) according to the formulations shown in the following table and were organoleptically evaluated.

|                | Formulation |      |
|----------------|-------------|------|
| Raw materials  | 1           | 2    |
| SCP (1)        | 40%         |      |
| SCP (2)        |             | 40%  |
| Wheat flour    | 5           | 5    |
| Saltless butter| 2.7         | 2.7  |
| Milk           | 52          | 52   |
| Salt           | 0.3         | 0.3  |

As a result of the evaluation, Formulation (2) was preferred in all respects (flavor, taste, sweetness and color), despite its sweet corn content being lower than (1).

EXAMPLE 5

Fresh sweet corn kernels were crushed while adding water. Thus, a sweet corn paste containing 75% water was obtained and was named sweet corn paste (1).

To this sweet corn paste (1), 9% of a dextrose-fructose syrup (25% water), and as amino acids, 0.2% of a soybean hydrolyzate which had been adjusted to contain 28% MSG, 9% aspartic acid, 11% glycine, 15% proline and 12% alanine, were added and mixed. This mixture was named sweet corn paste (2).

Sweet corn paste (1) and (2) were separately heated at 80° C. for 10 minutes, dried on a drum dryer and crushed. Thus corn powders (A) and (B) were obtained. Instant corn cream soup samples were prepared using (A) and (B) and organoleptically evaluated.

|                        | Formulation |      |
|------------------------|-------------|------|
| Raw material           | 3           | 4    |
| Corn powder (A)        | 35%         |      |
| Corn powder (B)        |             | 35%  |
| Wheat flour            | 10          | 10   |
| Corn starch            | 10          | 10   |
| Salt                   | 7           | 7    |
| MSG                    | 3           | 3    |
| Sucrose                | 9           | 9    |
| Skim milk powder       | 10          | 10   |
| Whole fat milk powder  | 10          | 10   |
| Vegetable fat          | 6           | 6    |

One hundred gram samples of each of formulations 3 and 4 were dissolved in 1 liter of water and cooked for 4 minutes. As a result of the organoleptic evaluation of the prepared soups, formulation 4 was preferred to formulation 3 in all respects (flavor, taste, sweetness and color) even though formulation 4 contained less sweet corn than formulation 3 due to the addition of the dextrose-fructose syrup and the amino acid mixture.

What is claimed is:

1. A process for enhancing the flavor of sweet corn, consisting essentially of:
   (a) converting sweet corn kernels into a paste;
   (b) contacting said sweet corn paste with about 1 to 15% by weight of at least one reducing sugar selected from the group consisting of dextrose, fructose and maltose; and about 0.1 to 0.8% of at least one amino acid selected from the group consisting of glutamic acid, aspartic acid, glycine, proline and alanine; and
   (c) heating the mixture of sweet corn paste-reducing sugar-amino acid to a temperature of about 80° to 100° C. for about 10 to 30 minutes thereby causing a reaction between the reducing sugar and amino acid to occur, resulting in an enhancement of the sweet corn flavor.

2. The process of claim 1(a), wherein the paste is formed by crushing the sweet corn kernels.

3. The process of claim 1, wherein the sweet corn paste has a 70 to 80% water content.

4. The process of claim 1, wherein the reducing sugar is a dextrose-fructose syrup containing equal amounts of dextrose and fructose.

5. The process of claim 4, wherein the dextrose-fructose syrup has a water content of about 25%.

6. The process of claim 1, wherein the amino acid is a mixture of hydrolyzed vegetable or animal protein.

7. The process of claim 6, wherein the amino acids are derived from hydrolyzed soybeans.

8. The process of claim 1(c), wherein the sweet corn paste is dried at a temperature of about 95° to 125° C., and converted into finely divided particles.

9. The process of claim 8, wherein the enhanced sweet corn is in the form of a powder and used to make soup.

10. The process of claim 1(b), wherein the amount of amino acid varies from about 0.1 to 0.6%.

11. The process of claim 1, wherein the sweet corn kernels are blanched prior to being converted into a paste.

* * * * *